United States Patent
Ramsey

Patent Number: 5,947,655
Date of Patent: Sep. 7, 1999

[54] ROTARY PIPE CUTTING APPARATUS

[76] Inventor: William L. Ramsey, 7601 Bullard Dr., Newcastle, Calif. 95658

[21] Appl. No.: 08/936,805

[22] Filed: Sep. 24, 1997

Related U.S. Application Data

[63] Continuation-in-part of application No. 08/719,318, Sep. 25, 1996, abandoned.

[51] Int. Cl.[6] .............................. B23B 5/16; B23B 51/00
[52] U.S. Cl. ............................ 408/80; 408/201; 408/229
[58] Field of Search .............................. 408/80–82, 196, 408/199, 200, 201, 225, 227, 229, 230; 82/113

[56] References Cited

U.S. PATENT DOCUMENTS

| | | |
|---|---|---|
| 2,409,776 | 10/1946 | Maples . |
| 3,088,202 | 5/1963 | Murray . |
| 3,532,010 | 10/1970 | Klintworth .............................. 408/201 |
| 3,595,107 | 7/1971 | Dackow .................................. 408/211 |
| 3,645,640 | 2/1972 | Zukas ........................................ 408/82 |
| 3,752,593 | 8/1973 | Fitzgerald et al. ...................... 408/1 R |
| 3,817,649 | 6/1974 | Medney .................................. 408/211 |
| 4,197,042 | 4/1980 | Krhounek et al. ...................... 408/200 |
| 4,580,934 | 4/1986 | McCormick ............................ 408/227 |
| 4,586,408 | 5/1986 | Goldner .................................. 408/211 |
| 4,691,600 | 9/1987 | Carlson et al. ............................ 408/80 |
| 4,693,643 | 9/1987 | Heyworth ................................. 408/82 |
| 4,720,219 | 1/1988 | Masonek et al. ....................... 408/201 |
| 4,975,001 | 12/1990 | Rabo et al. ............................... 408/82 |
| 5,000,629 | 3/1991 | Nygards .................................... 408/82 |
| 5,013,193 | 5/1991 | Rabo et al. ............................. 408/201 |
| 5,180,260 | 1/1993 | Phillips, Sr. ............................ 408/211 |
| 5,304,018 | 4/1994 | LaVanchy et al. ..................... 408/1 R |
| 5,312,209 | 5/1994 | Lindblom .............................. 408/227 |
| 5,314,270 | 5/1994 | Lavanchy et al. ..................... 408/196 |
| 5,401,126 | 3/1995 | Norris et al. ........................... 408/225 |

Primary Examiner—Steven C. Bishop
Attorney, Agent, or Firm—John P. O'Banion

[57] ABSTRACT

A rotary pipe cutting apparatus for removing sections of broken pipe from the bore of an outer pipe. The invention includes a cylindrical body with a longitudinal slot that is angularly offset from the rotational axis of the body and which is tapered in depth and width from top to bottom. A blade is included on the body adjacent the slot and the lower end of the body, with the blade having cutting edges which extend both downward and radially outward from the body. A detachable and interchangeable guide member is included on the lower end of the body, and a stopping member is included on the upper end of the body. A shank on the upper end of the body allows attachment of the apparatus to a rotary power tool.

18 Claims, 3 Drawing Sheets

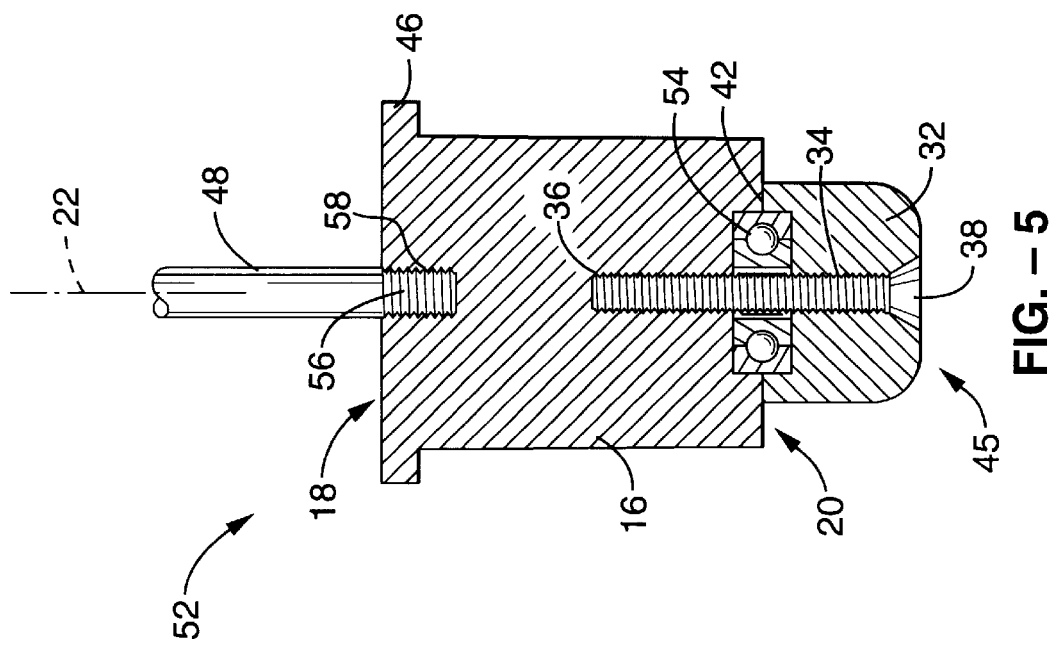
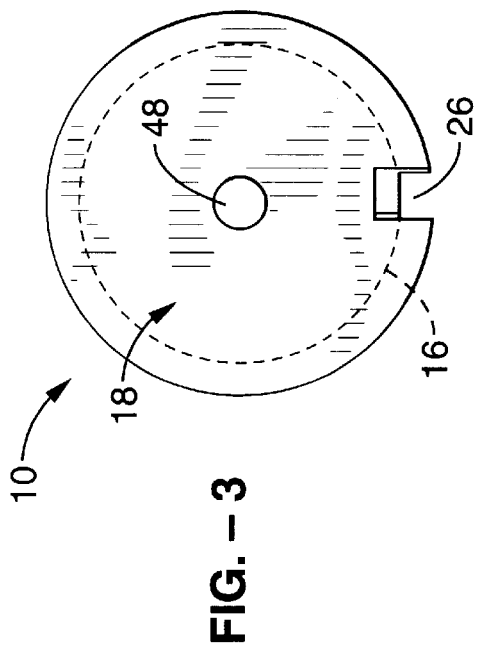
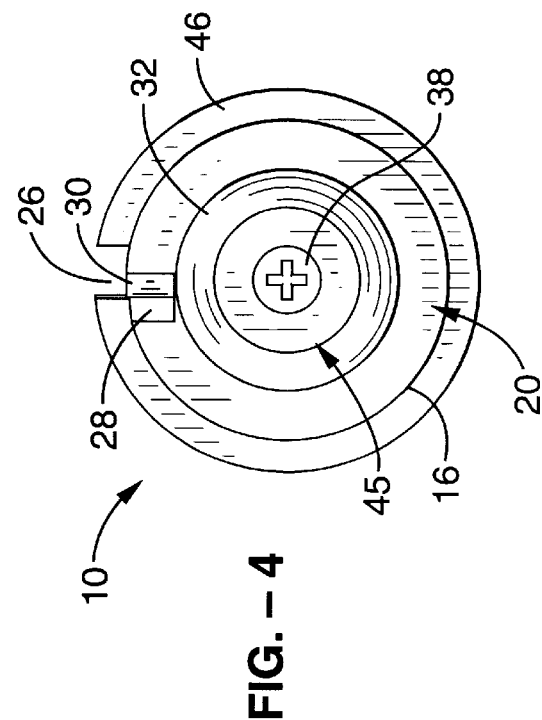

ROTARY PIPE CUTTING APPARATUS

CROSS REFERENCE TO RELATED APPLICATIONS

This application is a continuation-in-part of application Ser. No. 08/719,318 filed on Sep. 25, 1996 now abandoned.

BACKGROUND OF THE INVENTION

1. Field of the Invention

This invention pertains generally to devices and methods for cutting, boring and reaming pipes or tubes, and more particularly to a rotary pipe cutting apparatus for removing portions of broken plastic pipe from the bore of an outer pipe.

2. Description of the Background Art

The use of plastic pipe for irrigation and landscape sprinkler systems has become widespread due to the lower cost of plastic pipe compared to galvanized metal pipe. Polyvinyl chloride (PVC) and acrylonitrile-butadiene-styrene (ABS) plastics are the most widely utilized materials for fabrication of plastic pipes. One drawback associated with plastic pipe, however, is that it provides lower strength than galvanized metal pipe, and thus irrigation and sprinkler systems employing plastic pipe can be more prone to breakage and require more frequent repair. A common example of this problem is provided by a standard lawn sprinkler systems wherein a sub-ground plastic pipe network includes several "T" fittings which extend upward towards the ground surface for attachment of sprinklers. The sprinklers are generally attached to the "T" fittings by means of a plastic riser pipe sized to fit within the inner diameter of the "T" fittings and which are glued into the "T" fittings. If a sprinkler is inadvertently kicked or struck by a lawn mower or bicycle, the plastic riser pipe may break off and leave a broken portion glued within the "T" fitting. The broken portion of riser pipe prevents attachment of a new riser and sprinkler to the "T" fitting. To repair the break and replace the sprinkler, one must dig around the "T" fitting, cut the pipe around the "T" fitting, and then install couplings, a short length of pipe, and a new "T" fitting. This procedure is expensive, time consuming, and inconvenient. The use of threaded risers and "T" fittings has been introduced to facilitate the replacement of broken risers, but the broken threaded portions of such risers often cannot be successfully be removed from the threaded "T" fitting without damaging the "T" fitting, and thus the above-described inefficient procedure must still be used.

Several cutting, reaming, boring and chamfering tools have been developed to aid in removal of broken sections of plastic pipe from the bore of an outer pipe or pipe fitting. Typically, such tools are rotary in nature and employ one or more blades which cut or grind away the inner, broken pipe portion from the outer pipe. The currently available cutting devices, however, have proven deficient for various reasons. Particularly, the presently used devices are difficult to guide and control during cutting, and can damage the outer pipe during removal of the broken inner pipe. Another problem is that the individual devices are usually configured to remove an internal broken pipe portion of only a certain wall thickness or size, and cannot effectively remove inner pipe with a different wall thickness. Still another problem experienced with currently used cutting devices is that the shavings or turnings produced during cutting are not directed away from the cutting site but, instead, tend to be retained adjacent the blade or blades, and thus the device must periodically be withdrawn from the outer pipe during a cutting operation to clean the blade or blades and remove shavings.

Accordingly, there is a need for a rotary pipe cutting apparatus which provides for removal of broken plastic pipe from an outer pipe, which does not damage the outer pipe, which can be used to remove broken pipe of different wall thickness, and which does not cause buildup 5 of shavings adjacent to the cutting blade or require periodic removal of shavings during a cutting operation. The present invention satisfies those, needs, as well as others, and generally overcomes the deficiencies found in the background art.

SUMMARY OF THE INVENTION

The present invention pertains to a rotary pipe cutting apparatus which removes a broken section or portion of plastic pipe from the bore of an outer pipe without damaging the outer pipe, which provides for automatic removal of shavings from the cutting site during cutting operations, and which meets or exceeds the dimensional pipe sizing requirements dictated by ASTM D-1785. The apparatus can also be used to remove the inner threads from a threaded outer pipe for conversion into a slip fitting.

In general terms, the invention comprises a cylindrical body having a cutting blade and a longitudinal slot, an interchangeable sizing and depth guide member attached to the lower end of the body, a stopping member included on the upper end of the body, and a shank or rod on the upper end of the body for attachment to a rotational power source. By way of example, and not of limitation, the body of the apparatus is sized generally to the outer diameter of the broken pipe to be removed and slightly less than the inner diameter of the exterior pipe. The slot in the body extends longitudinally from the lower end to the upper end of the body, and is angularly offset relative to the rotational axis of the body. Preferably, the slot is tapered in depth and/or width from the upper end to the lower end of the body to aid in removal of shavings from the blade and adjacent areas. The cutting blade is adjacent to the slot and to the lower end of the body, and extends or protrudes outward radially and downward in relation to the slot. The guide member is of cylindrical configuration, and is sized to the inner diameter of the broken pipe to be removed. The guide member is releasibly fastened to the lower end of the body by a screw, bolt or the like, and may be exchanged with a differently sized guide member. The stop member preferably comprises an annular flange which extends outward radially from the body along the upper end thereof. The shank or shaft on the upper end of the body is structured and configured to be received by a conventional collet or spindle on a power drill or other rotational power source.

The invention is used by selecting a guide member which is sized to match the inner diameter of the broken pipe to be removed from an outer pipe or pipe fitting, and securing the guide member to the lower end of the body. The shank is attached to a conventional power tool, and the body of the apparatus is then inserted into the outer pipe, and positioned so that the guide member enters the bore of the inner, broken pipe. Rotary power is applied to the apparatus, and the cutting blade cuts or grinds away the inner, broken pipe. The guide member centers the body and holds the body in place during cutting so that the cutting blade does not inadvertently cut into or damage the outer pipe. The longitudinal slot allows shavings from the cutting blade to be directed upward past the upper edge of the body and away from the cutting operation. The angle and tapered shape of the slot facilitate removal of shavings or cuttings from the blade. The stop member prevents the apparatus from cutting further into the inner, broken pipe section than is required for replacement with another pipe section, so that time is not wasted cutting away more of the broken inner pipe than is necessary or cutting too deep.

An object of the invention is to provide a rotary pipe cutting apparatus which quickly, easily and efficiently removes broken pipe sections from the bore of an outer pipe or pipe fitting.

Another object of the invention is to provide a rotary pipe cutting apparatus which does not damage or cut into an outer pipe during removal of an inner, broken pipe.

Another object of the invention is to provide a rotary pipe cutting apparatus which has interchangeable guide members to accommodate broken pipe sections of different wall thickness.

Another object of the invention is to provide a rotary pipe cutting apparatus which is automatically removes shavings from the cutting blade and cutting site.

Another object of the invention is to provide a rotary pipe cutting apparatus which avoids wasting time during cutting by preventing the cutting away of broken pipe further than is required for replacement.

Another object of the invention is to provide a rotary pipe cutting apparatus which meets or exceeds the dimensional pipe sizing requirements of ASTM D-1785.

Another object of the invention is to provide a rotary pipe cutting apparatus which allows easy attachment to a drill motor, ratchet or brace.

Another object of the invention is to provide a rotary pipe cutting apparatus which is as safe to operate as a standard drill bit.

Another object of the invention is to provide a rotary pipe cutting apparatus which can be used with a wide range of popular residential, commercial and industrial pipe sizes.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 3 is a top plan view of the rotary pipe cutting apparatus of FIG. 1.

FIG. 4 is a bottom plan view of the rotary pipe cutting apparatus of FIG. 1.

FIG. 5 is a side elevation view in partial cross-section of a second embodiment of a rotary pipe cutting apparatus in accordance with the present invention.

FIG. 6 is an exploded view of a third embodiment of a rotary pipe cutting apparatus in accordance with the present invention.

FIG. 7 is a bottom plan view of the cutting disk portion of the apparatus shown in FIG. 6.

FIG. 8 is a perspective view of the cutting disk shown in FIG. 7.

FIG. 9 is a side elevation view of the cutting disk shown in FIG. 7 and FIG. 8.

DESCRIPTION OF THE PREFERRED EMBODIMENTS

Referring more specifically to the drawings, for illustrative purposes the present invention is embodied in the apparatus generally shown in FIG. 1 through FIG. 9, where like reference numbers denote like parts. It will be appreciated that the apparatus may vary as to configuration and as to details of the parts without departing from the basic concepts as disclosed herein.

Figure 1:
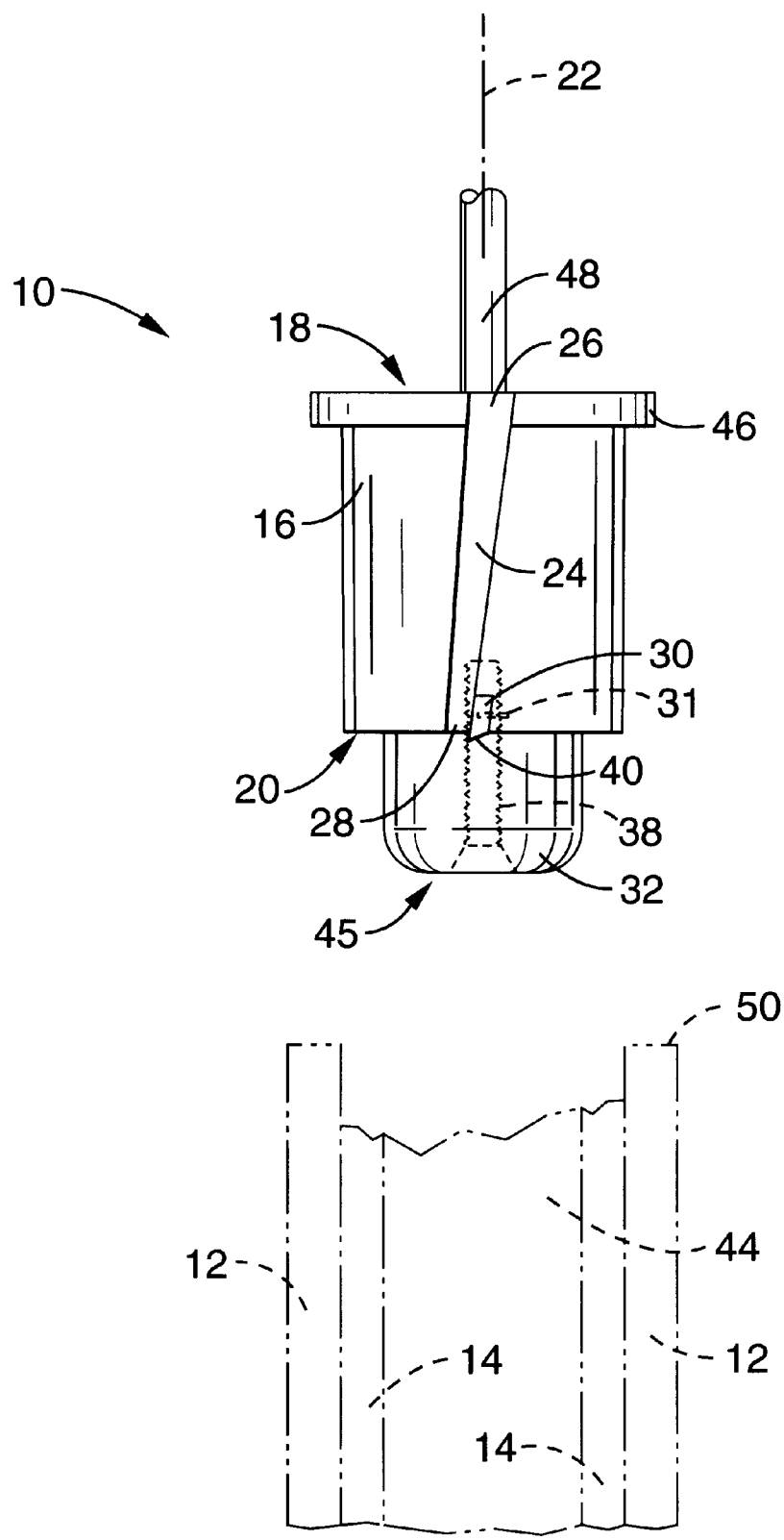
FIG. 1 is an assembled view in side elevation of a rotary pipe cutting apparatus in accordance with the present invention, shown adjacent to a section of broken pipe within an outer pipe fitting depicted in phantom.
Figure 2:
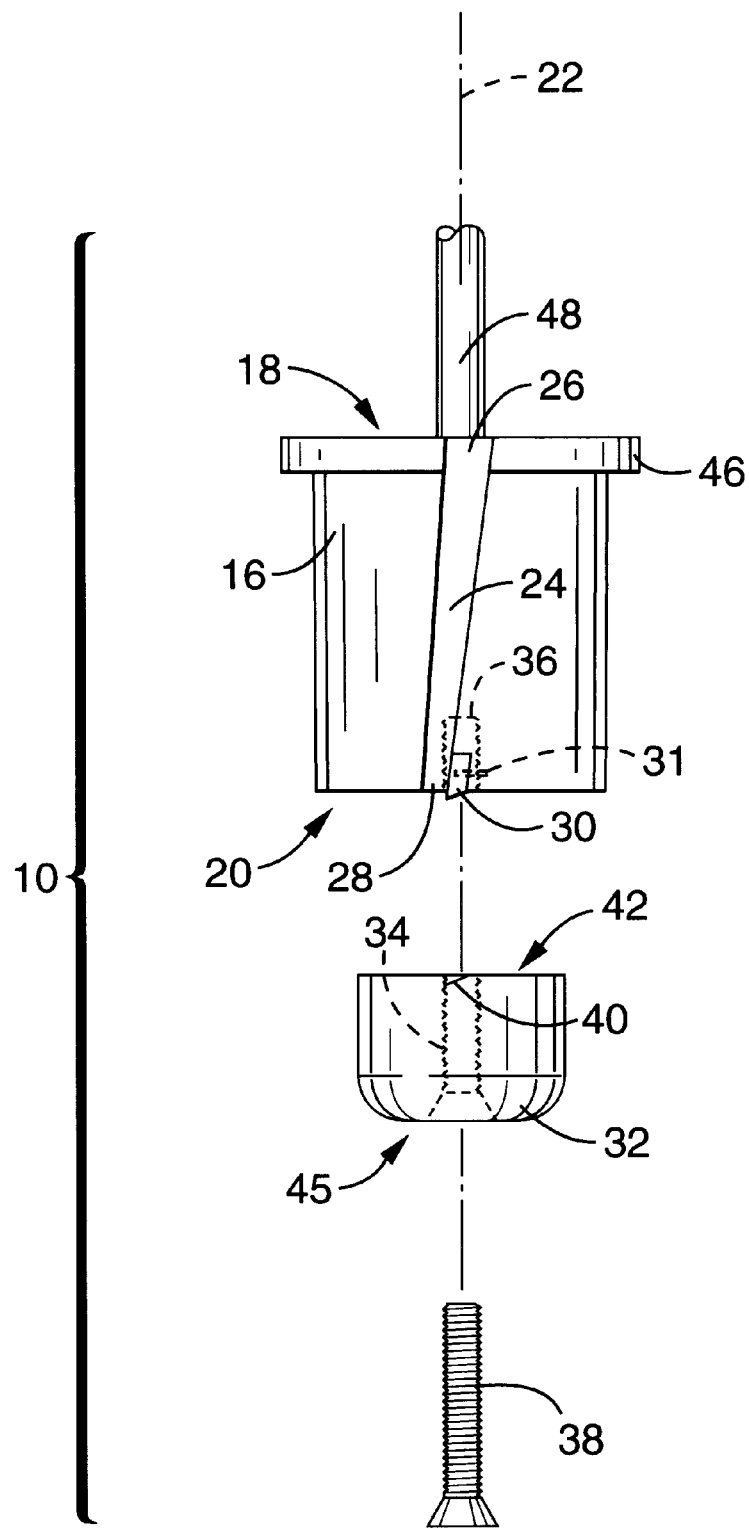
FIG. 2 is an exploded view of the rotary pipe cutting apparatus of FIG. 1.

Referring to FIG. 1 through FIG. 4, a rotary pipe cutting apparatus 10 in accordance with the invention is generally shown. The apparatus 10 is shown in FIG. 1 together with an outer pipe or pipe fitting 12 having a section of broken riser pipe 14 contained therein. Outer pipe fitting 12 and the internal section of broken riser pipe 14 depicts a common problem which occurs with sprinkler and irrigation systems using plastic pipe wherein a sprinkler (not shown) attached to a riser pipe has been inadvertently broken off to leave a broken portion or section 14 of the riser pipe within the outer pipe fitting 12 and bonded therein with adhesive. As described above, it is necessary to remove the section of inner, broken pipe 14 in order to replace the sprinkler.

The apparatus 10 includes a generally cylindrical body 16 having an upper end 18 and a lower end 20. Body 16 is sized to have a diameter which matches or is slightly less than the inner diameter of outer pipe or pipe fitting 12 and which matches the outer diameter of the internal broken riser 14. The diameter of body 16 may be varied as required for use with different sized pipes and/or pipe fittings. Body 16 includes a longitudinal rotational axis 22 which extends between upper and lower ends 18, 20. Body 16 is preferably made from solid, high quality aluminum or other metal and acts as a heat sink for heat generated from friction during rotational cutting operations. Body 16 could also be hollow to reduce weight and cost.

A generally longitudinal chip chimney or slot 24 is included on body 16, with slot 24 extending between upper and lower ends 18, 20 of body 16 and with slot 24 having a top end 26 adjacent upper end 18 of body 16 and a bottom end 28 adjacent lower end 20 of body 16. Slot 24 is tapered in depth from upper end 18 of body 16 to lower end 20 of body 16, so that top end 26 of slot 24 extends deeper into body 16 than bottom end 28 of slot 24, as can be seen most clearly by reference to FIG. 3 and FIG. 4. While the degree of taper can vary, approximately eight degrees of taper provides optimum results. Slot 24 is preferably tapered in width from upper end 18 of body 16 to lower end 20 of body 16, so that top or exhaust end 26 of slot 24 is wider than bottom end 28 of slot 24. Slot 24 is also angularly offset or angled relative to the longitudinal rotational axis 22 of body 16. The angle of offset for slot 24 is such that bottom end 28 of slot 24 leads, and top end 26 of slot 24 trails, during rotational motion of body 16 about rotational axis 22. The amount of angular offset can vary, but approximately five degrees has been found to provide optimum results.

A cutting blade 30 is included on body 16 adjacent slot 24 at bottom end 28 of slot, and adjacent lower end 18 of body 16. Cutting blade 30 is preferably attached to body 16 by a pin 31. Blade 30 extends outward radially from body 16 and downward from lower end 20 to provide outward facing and downward facing cutting edges on body 16. As body 16 rotates, blade 30 provides downward and outward cutting action which is used to cut away and remove the broken inner pipe section 14 from outer pipe 12, as described further below. Cutting blade 30 is made from a high quality tool steel with a precision ground edge, and is sized, shaped and positioned in a manner consistent with ASTM D-1785. Pin 31 is a stainless steel roll pin which is press fitted during final assembly of the apparatus 10. Pin 31 retains cutting blade 30 in proper position for cutting. Cutting blade 30 generally is permanently installed on body 16, but may be detachable and replaceable if desired.

A generally cylindrical depth and sizing guide member 32 is included with the invention, with guide member 32 detachably coupling to lower end 20 of body 16. Guide member 32 is sized to match the inner diameter of riser pipe 14. Guide member 32 is interchangeable and may be replaced by a different guide member 32 to accommodate a riser pipe section 14 having a different inner diameter. Preferably, guide member 32 includes a threaded counterbored, center hole or bore 34 and body 16 includes a threaded bore 36, with bores 34, 36 being generally co-linear with rotational axis 22. A screw or bolt 38 engages bores 34, 36 to hold guide member 32 onto body 16. A notch 40 is preferably included on the top end 42 of guide member 32 to accommodate blade 30. When guide member 32 is inserted into the bore 44 of inner pipe 14, body 16 is centered within outer pipe 12 and cutting blade 30 is aligned to cut away and remove inner pipe 14 without cutting into or damaging outer pipe 12. Guide member 32 is preferably rounded in shape adjacent bottom end 45. Guide member 32 is positioned in a manner consistent with ASTM D-1785, and prevents the apparatus 10 from plunging or over-excursion during cutting operations. The length of guide member 32 generally determines the depth of the cutting ability of the apparatus 10 and where the apparatus 10 stops in the event of "bottoming out" or contacting the bottom or lower surface (not shown) of a pipe.

The invention preferably includes stopping means for preventing upper end 18 of body 16 from entering pipe 12. The stopping means preferably comprises an annular flange or stop member 46 which extends radially outward adjacent upper end 18 of body 16. Flange 46 serves as a stop or barrier which prevents body 16 from entering or descending outer pipe 12 beyond or past upper end 18 of body 16 during cutting operations. Slot 24 extends through flange 46. The stopping means may alternatively comprise other structural features associated with upper end 18 of body 16 which stop or prevent body 16 from entering outer pipe 12 past upper end 18. Flange 46 is preferably integral to body 16, but may alternatively be separate and detachable from body 16.

Means for providing rotational power to body 16 are included with the invention in the form of a shank or drive shaft 48 which is coupled to upper end 18 of body 16. Shank 48 is co-linear with rotational axis 22 of body 16, and is structured and configured to fit within the standard adjustable collet or spindle on a power drill or other rotational power tool (not shown). Shank 48 may alternatively be replaced by a threaded bore which allows body 16 to be threaded onto a rotating member. Shank 48 may be removable and interchangeable with different sized shanks or like hardware for attaching body 16 to a rotational power source. Shank 48 may be made of hexagonal tool stock.

The apparatus 10 is used by selecting a guide member 32 having a diameter which matches the diameter of bore 44 of inner pipe section 14, and a body 16 which matches the inner diameter of outer pipe 12. Guide member 32 is then attached to body 16 by threading screw 38 through bore 34 in guide member 32 and bore 36 in body 16. Shank 48 is inserted into the collet of a power tool, and the collet is tightened to secure shank 48 and body 16 to the power tool. Guide member 32 is inserted into bore 44 of inner pipe 14 until blade 30 and lower end 20 of body 16 are adjacent inner pipe section 14. Rotational power is applied via shank 48 to rotate body 16 and attached blade 30. Blade 30 extends outward radially from body 16 and downward from lower end 20 to provide outward facing and downward facing cutting edges and, as body 16 is moved downward towards inner pipe 14, blade 30 cuts away inner pipe 14. As inner pipe 14 is cut away by blade 30, body 16 progresses into outer pipe 12 until flange 46 abuts the lip 50 of outer pipe 12. Flange 46 stops or prevents blade 30 from cutting away more of inner pipe 14 than is required for gluing a replacement riser pipe within outer pipe 12, thereby avoiding wasting time cutting away more of inner pipe 14 than is required, or cutting too deeply and damaging outer pipe 12. During cutting, guide member 32 keeps body 16 centered or aligned and prevents blade 30 from inadvertently cutting into or damaging outer pipe 12. When blade 30 has cut away inner pipe 14 to the point that flange 46 is adjacent lip 50 of outer pipe 12, body 16 is withdrawn from outer pipe 12 and a replacement riser pipe is installed therein in a standard manner.

While blade 30 is cutting away inner pipe 14, shavings or turnings (not shown) from the cutting operation are directed along slot 24 from bottom end of slot 28 adjacent blade 30 to top end of slot 26 and out of top end 26 and away from blade 30 and the cutting site generally. The angle of slot 24 relative to longitudinal rotational axis 22 allows the centrifugal action of body 16, while rotating and cutting, to drive the shavings along slot 24 away from blade 30 and out top end 26 of slot. The tapered width and tapered depth of slot 24 further aid in directing shavings along slot 24 and away from blade 30. Since the tapered shape makes slot 24 both wider and deeper at top end 26 than at bottom end 28, a "logjam" effect among the shavings which could plug up slot 24 is avoided. The rotary pipe cutting apparatus 10 thus provides for automatic removal of shavings or turnings during pipe cutting operations, and does not require periodic interruption of the cutting operation to clean shavings from the cutting tool.

Preferably, the user of the invention will maintain a set of several rotary cutting apparatus wherein each apparatus 10 includes a body 16 which is sized to match the inner diameter of a different sized outer pipe 12. A plurality of different sized guide members 32 are also preferably used interchangeably with the invention, with each guide member 32 sized to match the inner diameter of an inner pipe of different wall thickness. For example, standard one inch SCH pipe 40 pipe has a different wall thickness (and hence a different inner diameter) than standard SCH 80 pipe, both of which may be used for riser pipes by gluing into a "T" fitting. Flange 46 may be detachable and removable from body 16 if desired, to allow deeper cutting within outer pipe 12 which would otherwise be prevented by the interaction of flange 46 and lip 50 on pipe 12.

Referring now to FIG. 5, an alternative embodiment rotary cutting tool apparatus 52 is generally shown, wherein like reference numerals denote like parts. The apparatus 52 includes means for allowing guide member to rotate relative to body 16 in the form of a bearing 54 associated with the top end 42 of guide member 32. Bearing 54 permits guide member 32 to rotate freely about screw 38 and rotational axis 22 relative to body 16. The rotational motion of guide member 32 relative to body 16 as provided by bearing 54 prevents undesirable friction between guide member 32 and inner pipe section 14 which could otherwise slow down cutting operations. Shank 48 is shown with a threaded end 56 which engages a corresponding threaded bore 58 in the upper end 18 of body 16. In all other respects, the apparatus 52 is used in a manner generally identical to that described above for the first embodiment rotary pipe cutting apparatus 10. Referring now to FIG. 6 through FIG. 9, a further embodiment 60 of a cutting tool apparatus in accordance with the present invention is shown. Here, instead of employing a cutting blade 30 that is attached to body 16 as shown in FIG. 1 through FIG. 5, an annular cutting disk 62 is sandwiched between the lower end 20 of body 16 and the upper end 42 of guide member 32 as shown in FIG. 6. To prevent cutting disk 62 from rotating in relation to body 16, a hexagonal-shaped shank 64 extends through body 16 and engages a hexagonal receptacle 66 in cutting disk 62 as shown in FIG. 7. It will be appreciated that shank 64 could take on various alternative configurations without departing from the invention. For example, shank 64 could have a square cross-section, a triangular cross-section or the like, that mates with a corresponding keyway 68 that extends through body 16. Alternatively, the upper portion 70 of shank 64 could be cylindrical and coupled to body 16 in a like manner as previously described with regard to shank 48. In that case, body 16 could include a lower stub 72 that would extend outward to mate with cutting disk 62. It is also contemplated that cutting disk 62 could alternatively include a hub (not shown) that extends into keyway 68.

Referring also to FIG. 8 and FIG. 9, it can be seen that cutting disk 62 includes a slot 74 that is positioned in alignment with the lower end 28 of slot 24 in body 16, and a cutting blade 76 that is positioned along one edge of slot 74 as shown. Note that cutting blade 76 is an integral part of cutting disk 62, and is preferably fabricated by milling the surface 78 of a flat disk so as to leave only a cutting edge that forms cutting blade 76 and a central hub 80. Note also that central hub 80 serves as a spacer between cutting disk 62 and guide member 32 so that notch 40 (FIG. 2) is not required. Alternatively, central hub 80 could be omitted and a notch included on guide member 32 to receive cutting blade 76 as in the embodiments previously described. Preferably, cutting disk 62 is detachable for replacement if desired. Replacement can be easily effected by simply sliding cutting disk 62 off of shank 64 (or stub 72) and installing a new cutting disk in reverse order. Guide member 32 will hold cutting disk 62 in place when screw 38 extends into threads 82 in the lower end of shank 64 (or stub 72) and guide member 32 is thereby coupled to body 16.

Accordingly, it will be seen that this invention provides a rotary pipe cutting apparatus which removes broken sections of plastic pipe from the bore of another outer pipe without damaging the outer pipe and which provides for automatic removal of shaving from the cutting site during cutting operations. It will also be appreciated that, if desired, the invention can be used to remove the inner threads from the bore of an outer pipe to convert the outer pipe to a slip fitting. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A pipe cutting apparatus, comprising:
   (a) a cylindrical body having an upper end and a lower end;
   (b) said cylindrical body including a slot, said slot extending between said upper and lower ends, said slot angularly offset relative to a longitudinal axis between said upper and lower ends, said slot tapered in depth from said upper end to said lower end wherein said slot is deeper adjacent said upper end than adjacent said lower end, said slot tapered in width from said upper end to said lower end wherein said lot is wider adjacent said upper end than adjacent said lower end;
   (c) a cutting blade, said cutting blade coupled to said cylindrical body adjacent said slot and said lower end; and
   (d) means for coupling said body to a source of rotational power.

2. An apparatus as recited in claim 1, further comprising a guide member, said guide member coupled to said lower end of said cylindrical body member.

3. An apparatus as recited in claim 1, further comprising stopping means, included on said upper end of said cylindrical body, for preventing said upper end of said cylindrical body from entering a pipe.

4. An apparatus as recited in claim 2, wherein said guide member includes a notch adjacent to said cutting blade.

5. An apparatus as recited in claim 1, wherein said rotational coupling means comprises a shank joined to said upper end of said cylindrical body member.

6. An apparatus as recited in claim 3, wherein said stopping means comprises an annular flange adjacent said upper end of said cylindrical body.

7. An apparatus as recited in claim 2, further comprising means for allowing said guide member to rotate relative to said body.

8. A pipe cutting apparatus, comprising:
   (a) a cylindrical body having an upper end and a lower end, said cylindrical body having a central rotational axis between said upper and lower ends;
   (b) said cylindrical body including a longitudinal slot extending between said upper and lower ends, said slot angularly offset relative to said rotational axis, said slot tapered in depth from said upper end to said lower end, wherein said slot is deeper adjacent said upper end than adjacent said lower end, said slot tapered in width from said upper end to said lower end wherein said lot is wider adjacent said upper end than adjacent said lower end;
   (c) a cutting blade coupled to said cylindrical body adjacent said slot and said lower end;
   (d) a cylindrical guide member coupled to said lower end of said cylindrical body; and
   (e) a shank coupled to said upper end of said cylindrical body, said shank having a longitudinal axis co-linear with said rotational axis of said cylindrical body.

9. An apparatus as recited in claim 8, wherein said cylindrical guide member includes a notch adjacent said cutting blade.

10. An apparatus as recited in claim 8, further comprising an annular flange adjacent said upper end of said cylindrical body.

11. An apparatus as recited in claim 8, further comprising means for allowing said guide member to rotate relative to said body.

12. A pipe cutting apparatus, comprising:
   (a) a cylindrical body having an upper end and a lower end, said cylindrical body including a longitudinal rotational axis;
   (b) said cylindrical body including a longitudinal slot extending between said upper and lower ends, said slot angularly offset relative to said rotational axis, said slot tapered in depth from said upper end to said lower end, wherein said slot is deeper adjacent said upper end than adjacent said lower end, said slot tapered in width from said upper end to said lower end wherein said lot is wider adjacent said upper end than adjacent said lower end;

(c) a cutting blade coupled to said cylindrical body adjacent said slot and said lower end, said blade extending radially outward from said cylindrical body, said blade extending downward from said lower end of said cylindrical body;

(d) a cylindrical guide member coupled to said lower end of said cylindrical body;

(e) a stopping member adjacent said upper end of said cylindrical body; and (f) a shank coupled to said upper end of said cylindrical body, said shank co-linear with said rotational axis of said cylindrical body.

13. An apparatus as recited in claim 12, wherein said cylindrical guide member includes a notch on a top surface, said notch adjacent said cutting blade.

14. An apparatus as recited in claim 12, wherein said stopping member comprises an annular flange.

15. An apparatus as recited in claim 12, further comprising means for allowing said guide member to rotate relative to said body.

16. A pipe cutting apparatus, comprising:

(a) a cylindrical body having an upper end and a lower end;

(b) said cylindrical body including a slot, said slot extending between said upper and lower ends, said slot angularly offset relative to a longitudinal axis between said upper and lower ends, said slot tapered in depth from said upper end to said lower end;

(c) a cutting blade, said cutting blade coupled to said cylindrical body adjacent said slot and said lower end;

(d) annular flange adjacent said upper end of said cylindrical body configured for preventing said upper end of said cylindrical body from entering a pipe; and (e) means for coupling said body to a source of rotational power.

17. A pipe cutting apparatus, comprising:

(a) a cylindrical body having an upper end and a lower end;

(b) said cylindrical body including a slot, said slot extending between said upper and lower ends, said slot angularly offset relative to a longitudinal axis between said upper and lower ends, said slot tapered in depth from said upper end to said lower end;

(c) a cutting blade, said cutting blade coupled to said cylindrical body adjacent said slot and said lower end;

(d) a guide member coupled to said lower end of said cylindrical body member;

(e) means for allowing said guide member to rotate relative to said body; and (f) means for coupling said body to a source of rotational power.

18. A pipe cutting apparatus, comprising:

(a) a cylindrical body having an upper end and a lower end, said cylindrical body including a longitudinal rotational axis;

(b) said cylindrical body including a longitudinal slot extending between said upper and lower ends, said slot angularly offset relative to said rotational axis, said slot tapered in depth from said upper end to said lower end;

(c) a cutting blade joined to said cylindrical body adjacent said slot and said lower end, said blade extending radially outward from said cylindrical body, said blade extending downward from said lower end of said cylindrical body;

(d) a cylindrical guide member coupled to said lower end of said cylindrical body;

(e) an annular flange adjacent said upper end of said cylindrical body; and (f) a shank coupled to said upper end of said cylindrical body, said shank co-linear with said rotational axis of said cylindrical body.

\* \* \* \* \*